United States Patent [19]
Moyer

[11] Patent Number: 5,153,748
[45] Date of Patent: Oct. 6, 1992

[54] DETECTION OF GAPS IN SCANNED IMAGES

[75] Inventor: Alan L. Moyer, Chelmsford, Mass.

[73] Assignee: Eastman Kodak Company, Rochester, N.Y.

[21] Appl. No.: 413,856

[22] Filed: Sep. 28, 1989

[51] Int. Cl.$^5$ .............................................. H04N 1/40
[52] U.S. Cl. ................................... 358/443; 358/428; 358/447; 382/54
[58] Field of Search ............... 358/428, 443, 447, 448, 358/452; 382/54, 55, 56

[56] References Cited

U.S. PATENT DOCUMENTS

| | | | |
|---|---|---|---|
| 4,334,274 | 6/1982 | Agui et al. | 364/515 |
| 4,368,462 | 1/1983 | Crawley | 382/56 |
| 4,481,594 | 11/1984 | Staggs et al. | 364/521 |
| 4,528,642 | 7/1985 | Waller | 364/900 |
| 4,547,895 | 10/1985 | Mita et al. | 382/8 |
| 4,626,838 | 12/1986 | Tsujioka et al. | 340/744 |
| 4,646,076 | 2/1987 | Wiedenman et al. | 340/747 |
| 4,745,575 | 5/1988 | Hawes | 364/900 |
| 4,754,488 | 6/1988 | Lyke | 382/22 |
| 4,763,119 | 8/1988 | Matsubara et al. | 340/747 |
| 4,788,538 | 11/1988 | Klein et al. | 340/747 |
| 4,791,582 | 12/1988 | Ueda et al. | 364/522 |
| 4,815,009 | 3/1989 | Blatin | 364/518 |
| 4,821,336 | 4/1989 | Roye | 382/54 |

OTHER PUBLICATIONS

Haralick, R. M., Sternberg, S. R. and Zhuang, X. "Image Analysis Using Matematical Morphogy", *Transactions on Pattern Analysis and Machine Intelligence*, vol. PAMI-9, No. 4, Jul. 1987, pp. 532-550.

Kim, S., Lee, J. and Kim, J., "A New Chain-Coding Algorithm for Binary Images Using Run-Length Codes", *Computer Vision, Graphics, and Image Processing*, vol. 41, pp. 114-128, 1988.

Primary Examiner—Edward L. Coles, Sr.
Assistant Examiner—Thomas D. Lee
Attorney, Agent, or Firm—Cesari & McKenna

[57] ABSTRACT

A technique for detecting erroneous pixels in image data output by a scanner. A first aspect of the technique is to test for the existence of an erroneous gap by comparing the values of selected pixels to one of several predetermined patterns. A potential gap is identified wherever a center pixel of a background value is located between two pixels of a foreground value. A second aspect of the technique tests for the existence of an erroneous gap by examining the values of pixels surrounding the potential gap more completely. In particular, the relative sizes of two line features on either side of the potential gap are determined by tracing the feature's perimeters to locate terminus pixels. If the terminus pixels are farther apart than a predetermined distance, it is concluded that a gap exists. The technique can be easily adapted for rapid execution on both bitmap and run encoded image data.

26 Claims, 9 Drawing Sheets (Partial Preprocessing Stage)

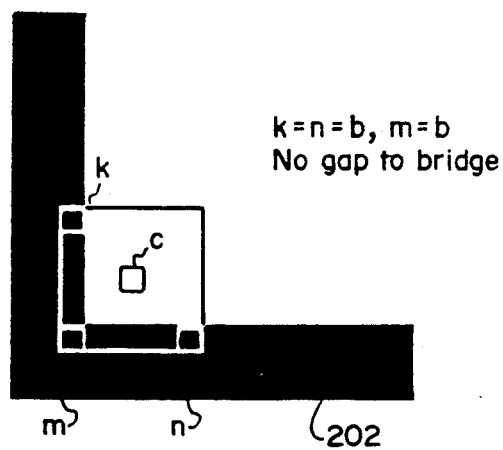
FIG. 5B
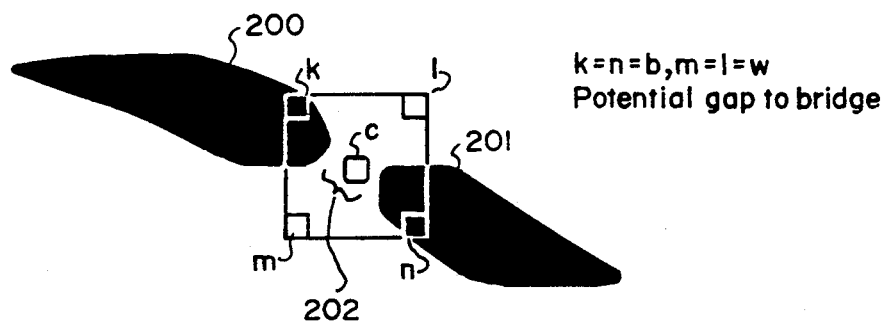
FIG. 5A
| k | l | m | n | o | p | q | r |
|---|---|---|---|---|---|---|---|
| b | w | w | b | x | x | x | x |
| w | b | b | w | x | x | x | x |
| x | x | x | x | b | w | w | b |
| x | x | x | x | w | b | b | w |
FIG. 5C D = 2d - epsilon : fail

DETECTION OF GAPS IN SCANNED IMAGES

FIELD OF THE INVENTION

This invention relates generally to electronic image processing, and particularly to a technique for detecting and filling gaps in scanned line-art images.

BACKGROUND OF THE INVENTION

An electronic representation of a visual source image is typically generated by a device called a scanner. A scanner horizontally and vertically scans the image with an optical detector to produce a detector output signal. The detector output signal consists of a series of samples, wherein the magnitude of each sample corresponds to the light intensity of a particular element, or pixel, in the source image. The detector output signal samples are thus often referred to as pixel values.

The pixel values are then typically digitized and read by a computer. The computer organizes them into a two-dimensional array, called a bitmap, wherein the (x,y) coordinates of the array location into which a particular pixel value is written are determined by the spatial position of the corresponding elemental area of the image. Each pixel value in the bitmap is a representation of the intensity, or some colorimetric property of a corresponding pixel in the source image.

Image processing operations such as translation, rotation, scaling, and coloring can then be performed on the bitmap representation, to generate an altered image. The altered image can then be further processed, or presented to a graphic display, printer, typesetter, or some other image output device.

However, the scanning process sometimes does not result in a bitmap that is a perfect representation of the source image. For example, if the source image originates as a line art sketch drawn by a human with a pen and paper, small gaps may be formed wherever thin lines in the original sketch do not align with the scan path of the optical detector.

In other words, if a horizontal thin line is sketched at an angle other than exactly straight across the paper, at some point during the scanning process the sketched line will cross from one horizontal scan line to an adjacent horizontal scan line. At such a point the pixel values representing the sketched line lie partially in one horizontal row and partially in an adjacent horizontal row of the bitmap.

Thus, when the optical detector is scanned over the image, some of the light energy from the thin sketched line, say 55%, is when the first horizontal line of pixels is scanned, and the remaining 45% of the energy is detected when the adjacent line of pixels is scanned. In the case of a black and white scanner, the optical detector typically uses a threshold detection scheme wherein a pixel is called white if, say, 50% or more of the light energy of a solid white pixel is present at a particular position of the scanner. As a result, neither scan of the image will result in the correct detection of the corresponding pixels as black. An erroneous white pixel "gap" in the bitmap representation of the sketched line thus results.

The response of a scanner to thin lines can be determined and is analogous to the response of a bandlimited detector to a modulated signal in a communications system. This response is often referred to as the scanner's modulation transfer function (MTF).

When the pen is lifted and returned to the surface of the paper, similar gaps may also be created.

Regardless of their sources, such gaps are usually so small that they are difficult to detect visually, and thus they do not appreciably affect the quality of the output image.

However, the presence of gaps in lines may adversely affect certain image processing operations. For example, an area fill algorithm typically operates by setting the value of all pixels within a bounded area to a particular background color. The bounded area is usually defined by lines of pixels of a certain foreground color. If gaps exists between the pixels that define the lines, then the area fill algorithm will "leak" outside the desired area, since that area is not actually bounded.

While a human may visually examine the image and fill in the gaps before an area fill operation is initiated, this is not practical in most instances. Consider that even if the source image is fairly small, say three by five inches, and if the scanner operates at a resolution of 300 pixels per inch, the resulting bitmap will contain over 1.35 million pixels. This clearly is too many pixels for a human to examine individually.

Some have proposed techniques that eliminate features of an image which are smaller than a certain size without geometrically distorting other features. For example, see the successive dilation and erosion process described in Haralick, R. M., Sterberg, S. R. and Zhuang, X., "Image Analysis Using a Mathematical Morphology," *IEEE Transactions on Pattern is and Machine Intelligence*, Vol. PAMI-9 No. 4, July, 1987, pp. 532-550. The dilation process sums a small fixed array of values to each pixel in a neighborhood surrounding a current pixel via matrix addition — the result is to "smear" the image, thereby "expanding" each small image feature so that it will merge with adjacent features. A subsequent erosion, or subtraction of the fixed array, "refocuses" or "shrinks" the image features back to their original size, in such a manner as to retain connections between any features merged during the dilation process. Unfortunately, this technique will indiscriminately bridge pixel areas which do not originate from the scanning process, and which are intended to remain separated.

What is needed is a technique for automatically detecting and bridging gaps created by the scanning process, without indiscriminately bridging gaps intentionally formed in the source image. This would prevent a subsequently executed area fill algorithm from leaking outside its intended boundaries.

The technique should also avoid bridging areas which are not actual line gaps, such as a gap intentionally formed between a line and the side of an object.

Because images may be stored in a variety of formats, including a raster format, wherein a value is specified for each pixel, as well as a run encoded format, wherein the starting coordinates or lengths of runs of pixels are specified, the technique should be easy to adapt to as many image encoding formats as possible.

SUMMARY OF THE INVENTION

The invention is a technique for detecting and bridging gaps in data that represents a scanned image. The image representation is processed by examining groups of pixels from the image in two ways.

In accordance with a first aspect of the invention, the pixel groups are compared with several predetermined patterns. If there is a sufficient match, it is concluded that a potential gap exists.

More particularly, the value of a current pixel and a number of its neighboring pixels are first determined. The location of the neighboring pixels can be thought of as being specified by a template centered at the current pixel. If the center pixel in the template is a background, or gap color, and the two pixels at directly opposite peripheral positions of the template are a foreground, or line color, it is concluded that a potential gap exists. If this test fails, other templates with different combinations of directly opposite peripheral pixels are tried.

In accordance with a second aspect of the invention, the pixel groups are examined to determine if they exhibit the topological characteristics of a broken line feature.

More particularly, the perimeter of each line feature is traced in a given direction for a predetermined number of pixels to locate terminus pixels on opposite sides of the potential gap. If these terminus pixels are farther apart than a predetermined distance, it is concluded that a gap exists. During the perimeter trace, if pixels on supposedly opposite sides of the gap are ever found to be a small distance from one another, it is concluded that there is no gap. The perimeter of the line features may then be traversed one more time, in the opposite directions. If the second perimeter tracing test is also passed, then it is concluded that the gap and adjacent line features have the topological characteristics of a broken line.

In the preferred implementation, the test for potential gaps is used to identify areas of the image where gaps may exist. The identified areas are then subjected to the broken line topology test to fill those gaps erroneously created by the scanner.

The invention has several advantages over prior art approaches. Because the potential gap detection technique is simple, it can typically be implemented to execute quite rapidly.

The broken line topology technique can be used to accurately distinguish broken lines erroneously encoded in an scanned image representation from broken lines which were part of the original source image.

The invention is easily adapted to operate with either bitmap or run encoded images.

Experiments on actual image data have shown that only a very small percentage of pixels pass the potential gap test. Thus, even when execution of the processing stage requires fairly complicated data processing, the overall processing time to determine the location of erroneous remains relatively small.

BRIEF DESCRIPTION OF THE DRAWINGS

The above and further advantages of the invention may be better understood by referring to the following description in conjunction with the accompanying drawings, in where:

FIGS. 5A and 5B illustrate situations where the preprocessing stage passes and fails;

FIG. 5C is a truth table for tests of the preprocessing stage;

DETAILED DESCRIPTION OF ILLUSTRATIVE EMBODIMENTS

The invention is a technique used by a computer imaging system to detect and correct erroneous gaps created in the representation of an image output by a scanner. The technique can distinguish between the gaps unintentionally resulting from scanner operation and the gaps intentionally formed between two image features.

Figure 1:
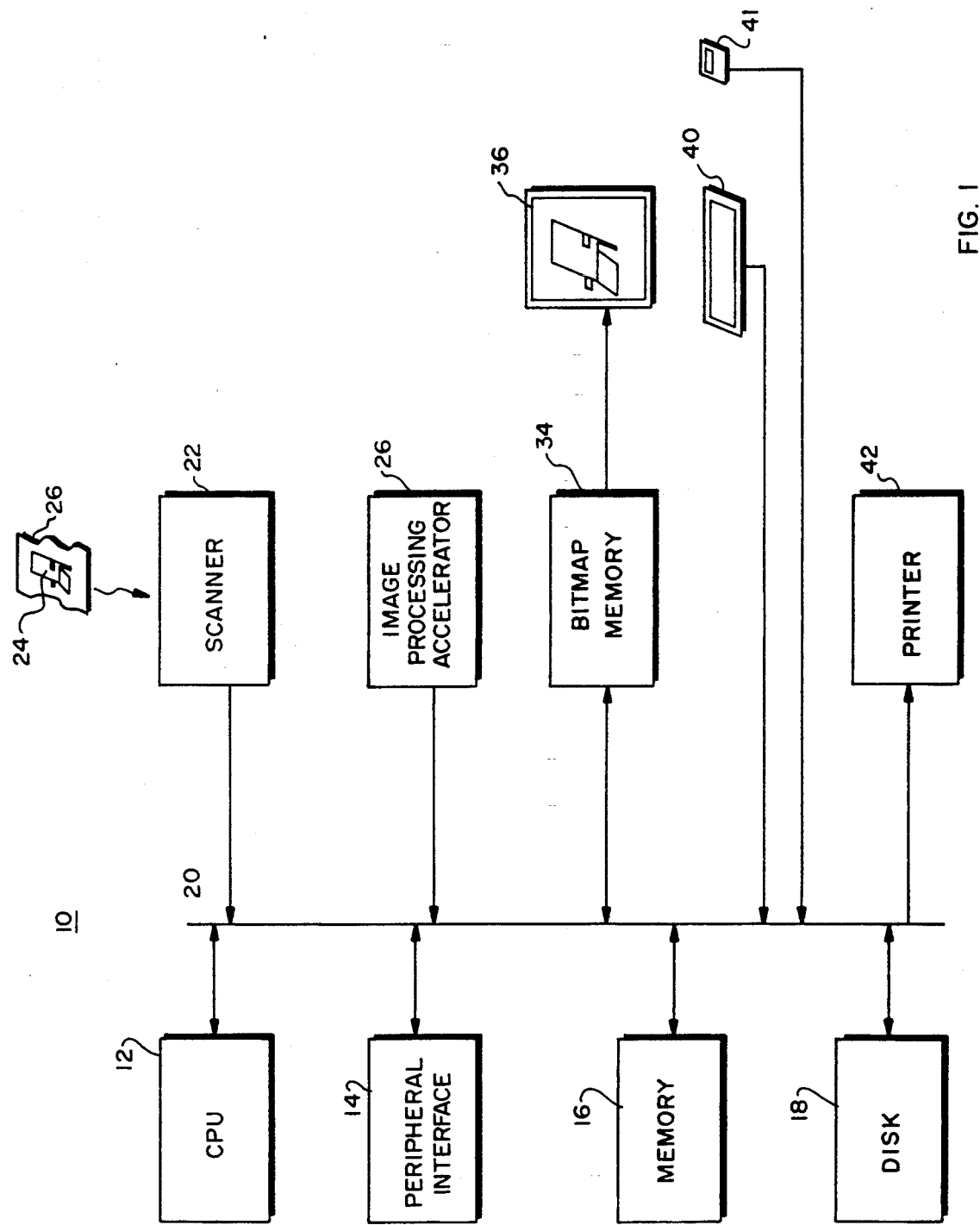
FIG. 1 is a block diagram of a computer imaging system which performs the line gap detection technique according to the invention.

FIG. 1 illustrates a typical imaging computer system 10 including a central processing unit (CPU) 12, a peripheral interface 14, a memory 16, and a disk 18. The components of the image system 10 are interconnected by a data processor bus 20. The imaging system 10 also includes a number of peripheral devices, such as a scanner 22, an image processing accelerator 26, a bitmap memory 34 and associated raster display 36, a keyboard 40, a mouse 41, and a printer 42.

The gap detection technique according to the invention is preferably embodied in an appropriate set of instructions which control the operation of the various elements of the imaging system 10.

In operation, the scanner 22 provides a computer-readable image representation of a visual source image 24, such as a line-art sketch on a piece of paper 26. It is assumed throughout the following discussion that the source image 24 consists of black lines on a white background; however, it will be apparent that the same principles can be applied to other types of images. The image representation discussed here thus contains white gaps in black lines.

The image representation is then fed to the CPU 12 via the bus 20. The CPU typically stores the image representation in the memory 16 or disk 18 in one of several formats. A bitmap image format represents the source image 24 as a two dimensional array of pixel values, with each pixel value representing the light intensity or color of a corresponding elemental area of the source image 24. A run encoded image format represents the source image 24 as a list of start and end coordinates of pixel runs having the same color. Other encoding formats are used where the codes represent the length of pixel runs having the same color.

The image representation is then typically processed in accordance with the invention, as will be described in detail below. These operations can be carried out by the CPU 12, the image processing accelerator 26, or even by the scanner 22 itself, if the scanner has an internal processor. The invention is not limited to operating on images encoded in a particular way, as will be seen.

Regardless of its format, the image representation is then typically read from the memory 16 to perform image processing operations such as translation, rotation, scaling, clipping, and other operations, such as area fill, to convert the image representation to a desired output form. The keyboard 40 and mouse 41 provide a way for a user to specify how the image representation should be manipulated. The image processing accelerator may be used to increase the speed at which these operations are performed.

Finally, in order to cause the output image to appear on the display 36, the imaging system 10 typically converts the image representation to a bitmap format, if necessary, and then writes the bitmap representation into the bitmap memory 34 associated with the raster display 36.

A hard copy of the output image may also be generated by passing the image representation to a printer 42.

Figure 2:
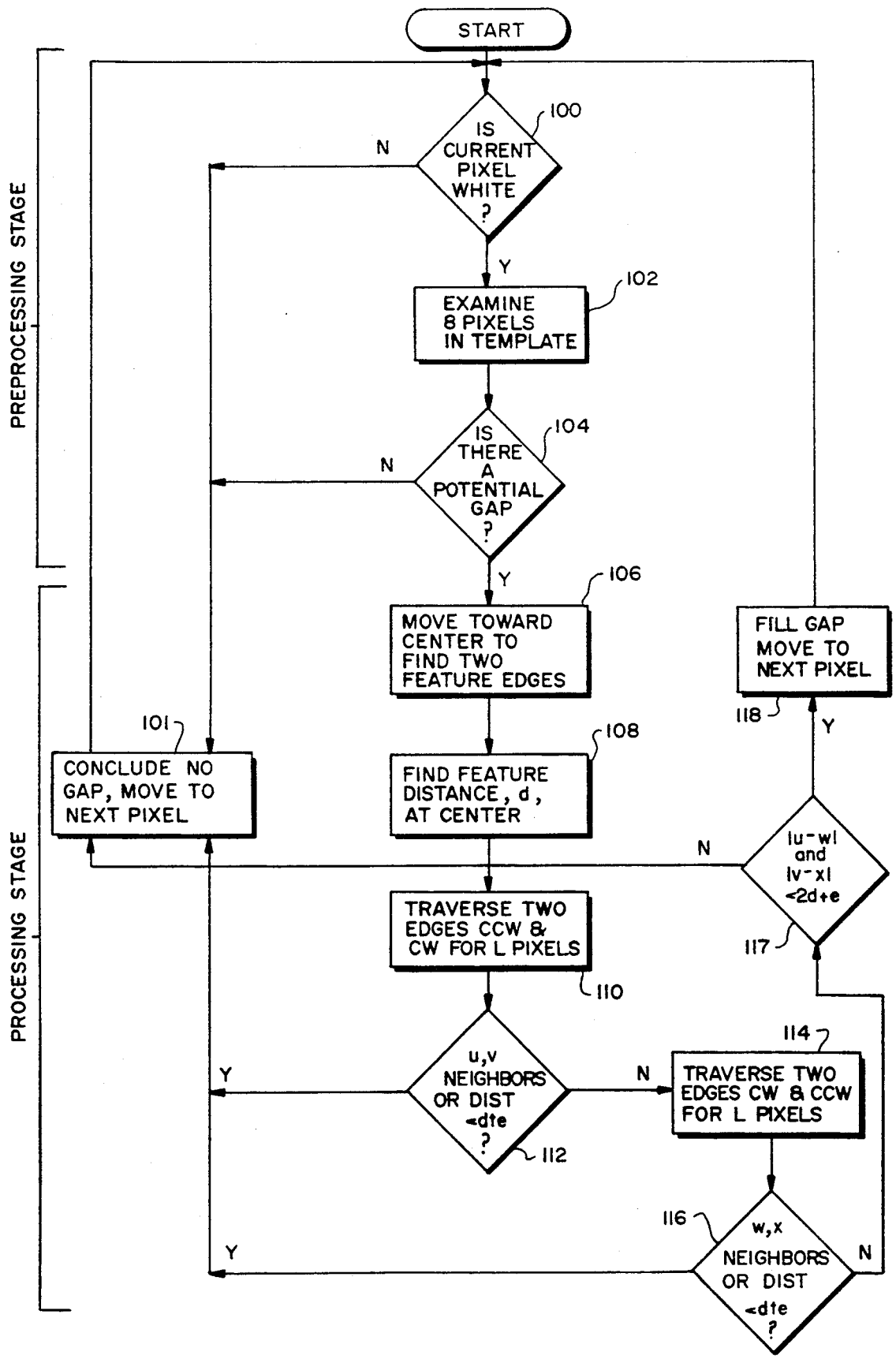
FIG. 2 is a flowchart showing the steps of the preprocessing stage and processing stage of the technique.
Figure 3:
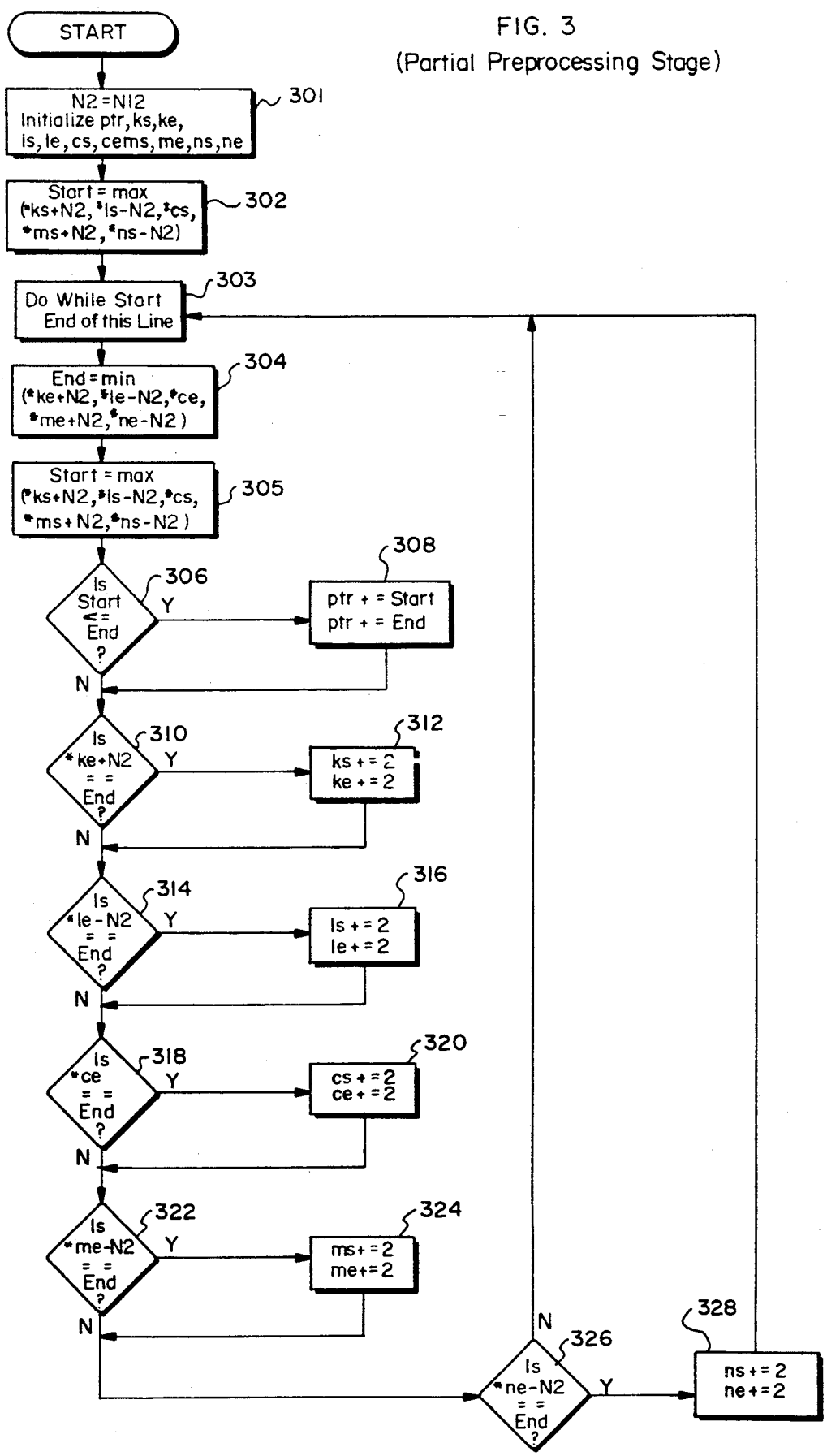
FIG. 3 is a flowchart of a portion of the preprocessing stage as performed on run encoded pixel data.

Now more particularly, an imaging system 10 operating in accordance with the invention performs a number of tests on the image representation, as indicated in detail in FIG. 2 and FIG. 3. These tests may be executed by the CPU 12 or image processing accelerator 26 as the image representation is output by the scanner 22, or they may be executed after the image has been stored in the memory 16 or on the disk 18.

The tests are preferably carried out in two stages. A preprocessing stage determines where potential gaps exist, by examining each pixel in the image representation and a small group of pixels surrounding each pixel. If selected pixels in the pixel group have one of several patterns, then a processing stage is preferably executed to determine if the potential gap is an erroneous scanned line or an intended image feature. The processing stage makes this determination by examining pixels along the periphery of the potential gap. If these pixels have the topological characteristics of an erroneously scanned line, the gap is "filled" by changing the corresponding pixel values to a foreground color. While the preferred embodiment of the invention uses both stages of the test, all potential gaps identified by the preprocessing stage may be filled.

FIG. 2 is a detailed flowchart of the preprocessing and processing stages of the gap test as performed on an image encoded in bitmap form. The initial step of the preprocessing stage, step 100, is to examine a current pixel of the bitmap representation. If the current pixel is not white, then control passes to step 101, where another pixel is set to the current pixel. Control then returns back to step 100, so that this next pixel is tested.

However, if step 100 does find a white pixel, then step 102 of the preprocessing stage examines the value of eight pixels near the current pixel. The purpose of this examination is to determine if the current pixel is located in a gap between two features of the image, as indicated by pixels of the line color being on either side of the current pixel.

The eight pixels examined are those that correspond to the corners of a rectangle centered over the current pixel, and the four pixels directly above, below, to the left, and to the right of the current pixel. Considering FIG. 4 momentarily, these eight pixels can be thought of as being positioned along the periphery of a template. In the implementation being discussed, the template is a square of N by N pixels, with the current pixel, c, located in the center of the template. Pixels k, l, n, and m are at the upper left, upper right, lower right, and lower left corners of the template, respectively. Pixels o, p, q, and r are to the left, to the right, above, and below the current pixel c, respectively.

Figure 4:
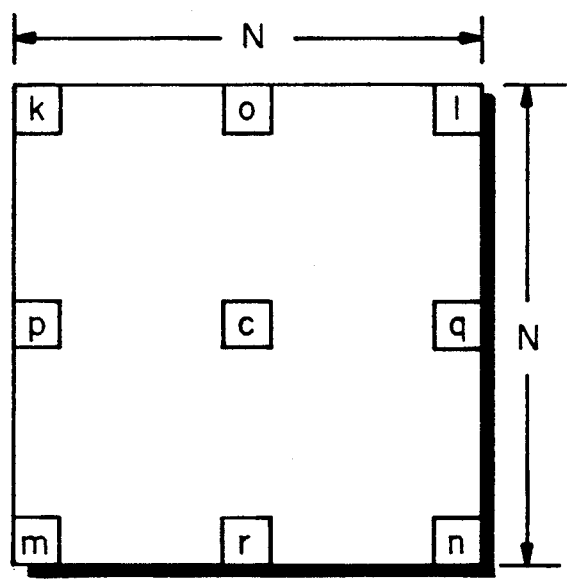
FIG. 4 depicts the template showing the relative positions of a center pixel and neighboring pixels.

Using the N×N template of FIG. 4, the process of FIG. 2 will detect gaps that are less than or equal to N−2 pixels wide. Thus, the choice of parameter N is dependent upon a number of conditions such as the expected maximum gap size, the width of the pen used to create the original image, and the modulation transfer function (MTF) of the scanner.

Returning attention to FIG. 2, control next passes to step 104, where a determination is made of whether a potential gap exists at the current pixel c. Potential gaps are considered to be those which bridge the diagonal, horizontal, or vertical directions of the template. As shown in FIG. 5A, such a potential gap 202 may be formed between an upper-left line feature 200 and a lower-right line feature 201. In this instance, the template is located such that the current pixel c is white, or in the gap 202, and the upper left pixel k and lower-right pixel n are black, or in a line feature. The upper right pixel n and the lower left pixel m are also white.

FIG. 5B depicts a situation where the current pixel c is white but where there is no potential gap. In this instance, the upper-left pixel k, the lower-left pixel m and the lower-right pixel n are black. Such a situation typically occurs in the corner of a feature or other place where two lines intersect at an angle.

FIG. 5C is a truth table for all situations that indicate a potential gap. The table assumes the current pixel c is white. The abbreviations used in the table are b for black pixel, w for a white pixel, and x for either color.

Each row of the table represents a combination of peripheral pixel values which indicates a potential gap. For example, the first row indicates that a diagonally-oriented potential gap exists if the corner pixels k and n are black and the opposite corner pixels m and 1 are white, regardless of the colors of the other four pixels. Similarly, the second row indicates there is a potential gap across the opposite diagonal if the corner pixels 1 and m are black and the opposite corners k and m are white. Gaps may also be indicated by black pixels at the upper and lower positions o and r with white pixels to the left and right at p and q; as well as with black pixels at the left and right p and q and white pixels at the upper and lower positions o and r. The third and fourth rows of the table depict these combinations.

Returning attention to FIG. 2, if one of the conditions in the truth table of FIG. 5C is true, control passes to step 106, where the processing stage begins. Otherwise, it is concluded that no gap exists at the current pixel position, and control returns to step 101, where another pixel is subjected to the preprocessing stage.

In experiments performed with sets of various scanned line art images, less than one percent of pixels pass the preprocessing stage of steps 100, 102, and 104. Thus, the preprocessing stage of the test screens most pixels from submission to the processing stage.

The remaining steps depicted in FIG. 2 comprise the processing stage of the test. The processing stage determines if the potential gap at the current pixel c is between the two ends of an unintentionally broken line, or if the potential gap is intentionally left between two intended features of the image. These two situations are depicted in FIGS. 6A and 6B, respectively.

Figure 6A:
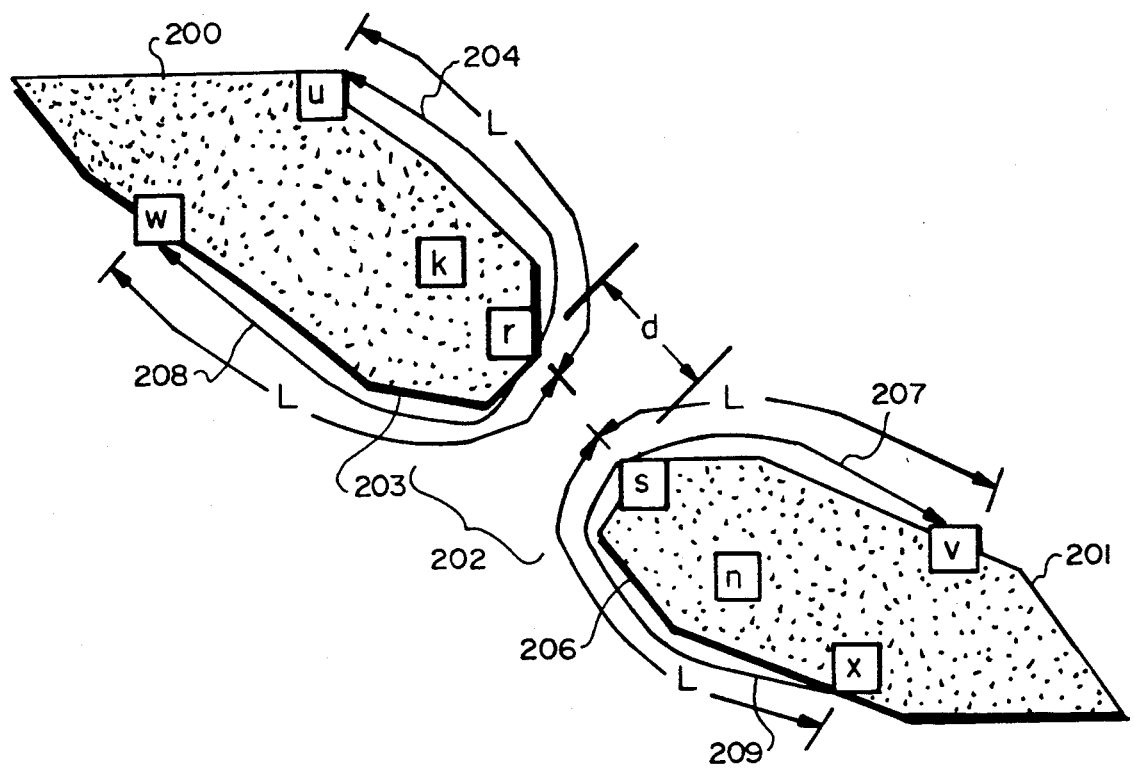
FIGS. 6A and 6B illustrate situations where the processing stage passes and fails.

FIG. 6A depicts a typical thin line which begins with the upper-left feature 200 and then continues with the lower-right feature 201. However, either the sketched line representation was improperly interrupted by the scanner, or the pen left the paper momentarily, and thus a gap 202 was created.

Figure 6B:
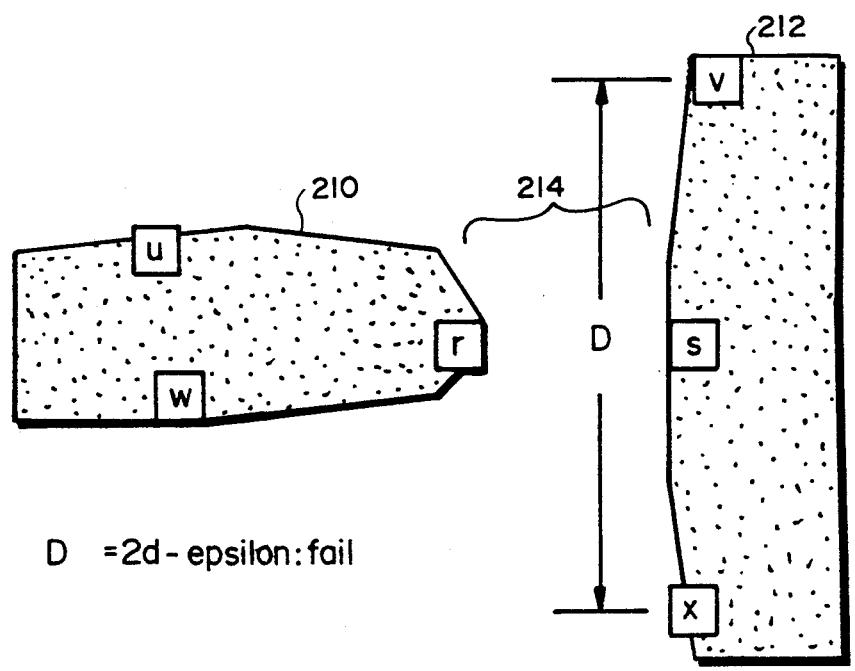

FIG. 6B is typical of the situation where a feature 200 terminates some distance away from a feature 201 that is actually the boundary of another object. In this instance, the gap 202 thus formed typically should not be filled.

Returning attention to FIG. 2, the determination of whether the FIG. 6A situation or the FIG. 6B situation exists begins in step 106. This step 106 traverses pixels inward toward the current pixel c, from one of the peripheral pixels, such as pixel k, until a pixel r is located. Pixel r is innermost black pixel on the line of pixels between pixel k and pixel c. An innermost black pixel is located for each of the feature edges.

Next, pixels are similarly traversed beginning at a peripheral pixel n to locate a pixel s, which is the innermost black pixel in the lower feature 201.

The distance, d, between pixels r and s is then determined in step 108.

In step 110, the perimeter of the two line features on either side of the gap 202 is then traversed for a fixed number of pixels, L. Turning attention to FIG. 6A, step 110 first traces the perimeter of the upper feature 200 in a counterclockwise direction, starting at pixel r, as indicated by the arrow 204. The perimeter is traced in the counterclockwise direction by following pixels along the black-white transition edge 203 of upper feature 200. Similarly, the perimeter 206 of the lower feature 201 is traced in a clockwise direction beginning at pixel s, as indicated by the direction of arrow 207. A terminus pixel u is thus located L pixels away from pixel r along the perimeter 203 in the counterclockwise direction. Another terminus pixel v is thus located L pixels away from pixel s in the clockwise direction.

A number of perimeter tracing methods are known in the art. The preferred method here uses a chain code as described in Freeman, H., "On the Encoding of Arbitrary Geometric Configurations," *IRE Transactions on Electronic Computers*, June 1961, pp. 260-268.

Figure 6C:
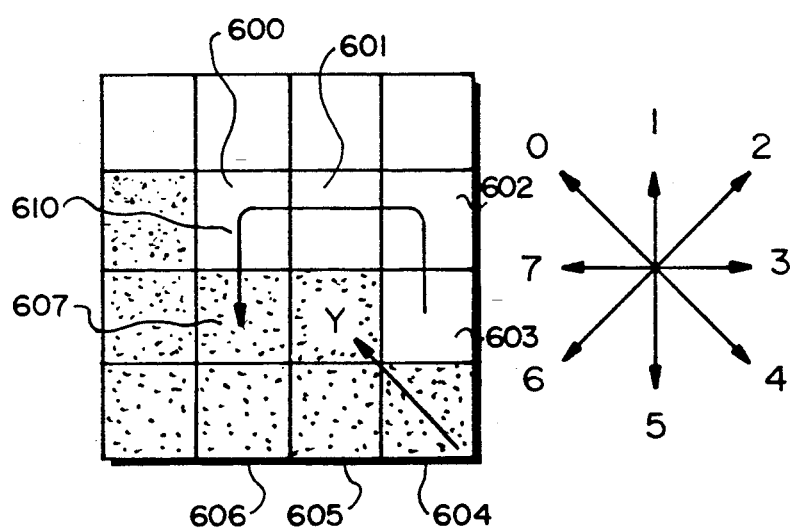
FIG. 6C depicts the Freeman chain code number assignment to relative directions.

The Freeman chain code technique assigns an integer number to the neighbors of a present pixel, y, known to be on the perimeter, as shown in FIG. 6C. Pixel y thus has eight neighbors in eight directions, with numbers 1 through 8 assigned to the directions as shown in the eight arrows adjacent the pixel diagram.

Perimeter tracing proceeds as follows. Assume that pixel y was arrived at from its neighbor pixel 604 lying in a direction, a. The next perimeter pixel in the counterclockwise direction is located by first testing the pixel lying in the direction assigned to the number $(a-1)$ modulo 8. If that pixel is not black, then the other neighboring pixels, $(a-2)$ modulo 8, $(a-3)$ modulo 8, etc., are tested in that order, until a black pixel is found.

Thus, in the example being discussed, the first pixel checked is pixel 603 in direction 3, or the one immediately to the right of pixel y. The neighboring pixels are then examined in counterclockwise order, until the first black pixel is encountered, at pixel 607.

The procedure is similar for clockwise edge-tracing, except that the search proceeds in the opposite direction, starting at the pixel in the direction $(a+1)$ modulo 8, and continuing to the pixels in direction $(a+2)$ modulo 8, $(a+3)$ modulo 8, etc.

Returning to FIG. 2, in step 112, if edge pixels from the same small neighborhood, such as the same 3×3 pixel area, it is concluded that the features on either side of the gap are close enough to touch, and thus no gap exists. In this instance, control returns to step 101.

If the edge pixels are not located in the same small neighboring, then the distance between the terminus pixels u and v is measured. If this distance is greater than the gap distance d plus a predetermined constant e, then control passes to step 114. However, if this distance is too small, it is concluded that no gap exists, and control returns to step 101.

In step 114, a second perimeter tracing test checks the perimeters of the other pair of opposite sides. In other words, a perimeter search is made clockwise in the direction of arrow 208 from pixel r, and counterclockwise in the direction of arrow 209 from pixel s. The location of perimeter terminus pixels w and x are thus determined. As in the first perimeter tracing test, if any point traversed on one of the edges is found to be in the same small neighborhood as a point traversed on the other of the edges, it is indicated that no gap exists, in step 116. If not, and if the distance between terminus pixels w and x is greater than d + e, then a gap may still exist, and control passes to step 117.

In step 117 a final check for the existence of a gap is performed. In particular, the distance between terminus pixels of the upper feature, pixels u and w, and the distance between terminus pixels of the lower feature, pixels v and x, are computed. If both these distances are less than a predetermined amount, such as 2d + e, then it is finally indicated that a gap between line segments exists, such as the gap shown in FIG. 6A. Control then passes to step 118, where the gap is filled by coloring a line of pixels black in the gap 202. However, if this test fails, it is indicated that the gap is where a line segment terminates adjacent the edge of an object, such as the gap shown in FIG. 6A, and control passes to step 101.

The processing stage is thereby concluded for the current pixel. In either event, the next pixel is then submitted to the preprocessing stage of the test, in step 100.

Those of skill in the art will appreciate that with some adaptation, the invention can operate on an encoded image, without first decoding it into bitmap form. Depending upon the type of image encoding used and the specific implementation of the gap detection test, it may not be efficient to perform the processing stage without first decoding the image.

However, because the preprocessing stage is a relatively simple test, it can usually be easily adapted to operate on the encoded image nonetheless. A substantial advantage ca result, since the preprocessing stage effectively screens 99% or more of the image from the further, more complicated processing stage.

Therefore, an efficient implementation of the invention for a run-encoded image typically executes the preprocessing stage to identify the coordinates of runs of pixels which may contain gaps. After this list of runs is compiled, the more complicated processing stage can be executed by decoding only those portions of the image which passed the preprocessing stage.

An example of how one portion of the preprocessing stage is implemented to operate on a run encoded image is shown in detail the flowchart of FIG. 3. A preliminary discussion of how the preprocessing stage is generally carried out with run encoded images helps to clarify the details of the steps depicted there.

In the embodiment of the preprocessing stage next described, it is assumed that the run encoded image representation is a list of coordinates. Each coordinate indicates the start x-coordinate of a run of pixels of the same color on a given scan line. The x-coordinates are specified as an integer number that increases as the distance of the pixel runs from the left-hand edge of the image increases. It is also assumed that pixel runs can only be black (the foreground color) or white (the background color), so that the pixel values associated with successive run coordinates alternates. Adaptation of the below-described technique can be made for other types of image encoding schemes, however.

This embodiment of the preprocessing stage outputs a list of the start and end x-coordinates of pixel runs that match the templates corresponding to the tests of the table in FIG. 5C. The output list of coordinates is determined on a line-by-line basis, by comparing the start and end x-coordinates of pixel runs disposed in a relative spatial relationship as specified by the templates.

Figure 7:
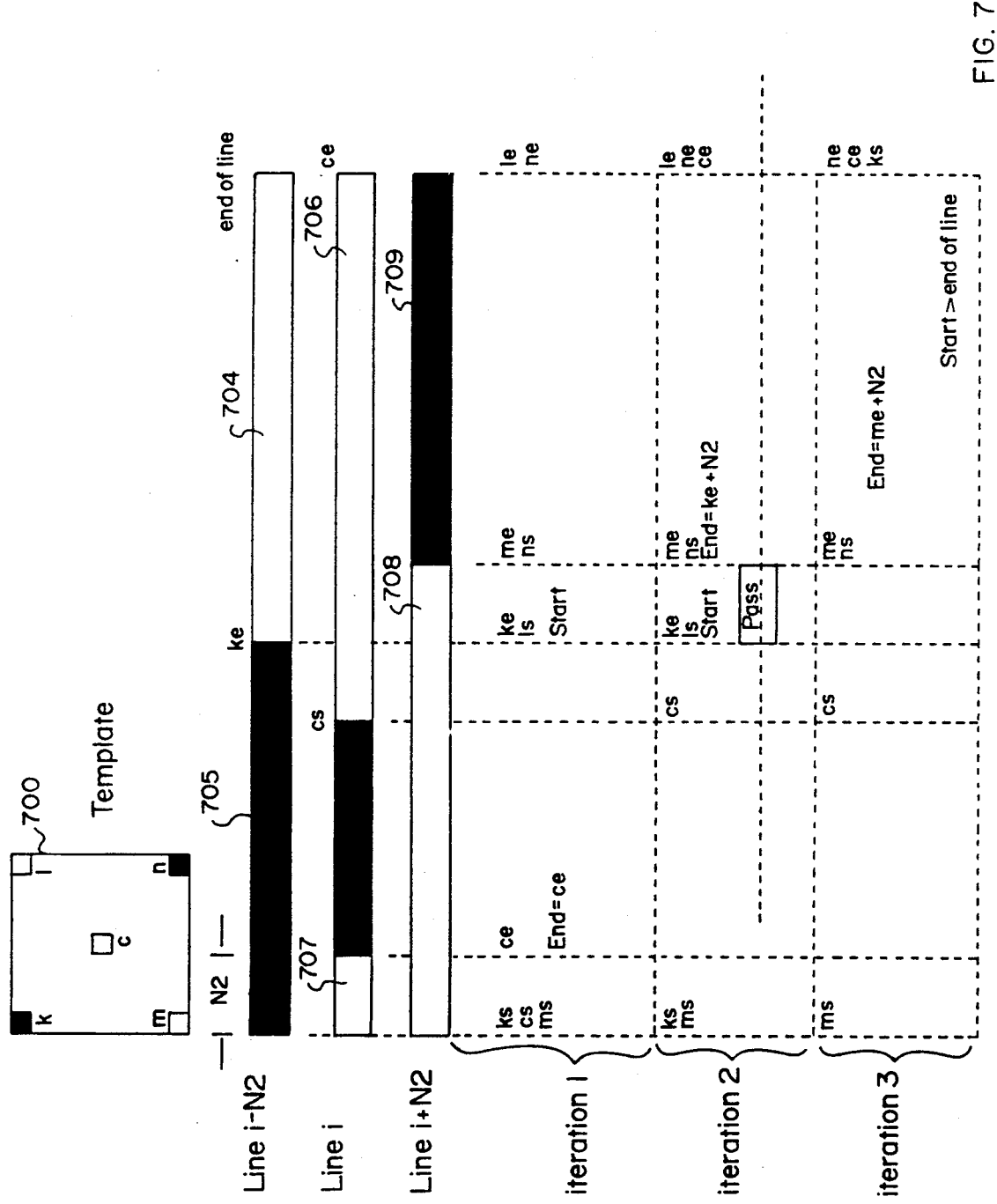
FIG. 7 depicts how the preprocessing stage operates on a run encoded image.

For example, consider the template 700 shown in FIG. 7 which corresponds to the test in the first row of FIG. 5C. Three exemplary lines of pixels from a typical image are depicted beneath the template 700. A current line of the image, number i, contains possible pixel c's in any run of white pixels, such as white runs 706 and 707. Line number i-n2 (where n2 equals N/2 and N equals the width of the template 700) contains possible pixel k's in each black run, such as black run 705, as well as possible pixel l's in white runs located to the right of each black run, such as white run 704. Likewise, line number i+n2 contains possible pixel m's in white run 708 and possible pixel n's in an adjacent black run 709.

The pixels in a white run on line i which pass the test of template 700 can be identified by comparing the start and end coordinates for each possible pixel run c, k, l, m, and n to find a sequence of x-coordinates for which all five conditions are true. For example, assume the start and end x-coordinates of current black run 705 of possible pixel k's are ks and ke, respectively (the ke x-coordinate is found by subtracting one from the start x-coordinate of the adjacent white run 704). Assume also that the start and end x-coordinates of a current white run 706 are cs and ce, respectively, and recall that any possible pixel k is n2 pixels to the left of any possible pixel c.

A sequence of pixels on line i which satisfies both the pixel c condition and the pixel k condition thus starts at the x-coordinate equal to the greater of cs and ks+n2, and ends at the lesser of ce and ke+n2. If the start x-coordinate is greater than the end x-coordinate, no pixel in the current run satisfies both conditions. Because the template 700 specifies the values of three other pixels, a similar comparison of start and end coordinates must be made for the other possible pixel runs as well.

Now, considering FIG. 3 more particularly, it will be understood how this start and end coordinate comparison procedure can be efficiently implemented. FIG. 3 shows in detail only how the test in the first row of the FIG. 5C table is handled, namely, the test that determined whether pixels k and n are black and pixels c, m, and l are white. A process similar to that shown in FIG. 3 is required for each of the four tests of FIG. 5C.

The first step 301 is to initialize a number of variables and pointers. For example, a variable n2 is set equal to N/2, where N is width of the template.

Pointers to the start and end coordinates for each of the possible pixel runs for the five template pixels c, k, l, m, and n are also initialized. Since the run-encoded image representation discussed here contains only the start x-coordinates of runs, the end x-coordinate of a given run is assumed to be equal to the start coordinate of the next adjacent run.

Thus, the start and end x-coordinates for a given pixel run are stored in successive memory locations. For example, if the start x-coordinate of a first possible pixel k run is stored in the memory location at address M, its corresponding end x-coordinate is stored at location M+1 (i.e., the start coordinate of the next run). The start and end x-coordinates of the next possible pixel k run are stored at locations M+2 and M+3, respectively, and so forth. A pointer ks is initially set equal to the address of the start x-coordinate for the first possible pixel k run, and a pointer ke is initialized to the address of end x-coordinate for the first possible pixel k run, namely M+1.

A pointer ptr is initialized to a memory location where a list of pixel sequences which pass the test will be stored.

Thus, variables used as pointers to locations in the encoded pixels run list are initialized as follows, with i being the index of the current line:

| | |
|---|---|
| ks | pointer to the start x-coordinate of the first (leftmost) black run on line i-n2, which is also the start x-coordinate of the current run of possible pixel k's |
| ke | pointer to the end x-coordinate of the current possible pixel k run (equal to ks+1, which is the same as the start x -coordinate of the first white run on line i-n2) |
| ls | pointer to the start x-coordinate of the first white run on line i-n2, which is the current run of possible pixel l's (equal to ke) |
| le | pointer to the end x-coordinate of the current possible pixel l run (equal to ls+1) |
| cs | pointer to the start x-coordinate of the first white run on line i, which is the current run of possible pixel c's |
| ce | pointer to the end x-coordinate of the current possible pixel c run (equal to cs+1) |
| ms | pointer to the start x-coordinate of the first white run on line i+n2, which is the current run of possible pixel m's |
| me | pointer to the end x-coordinate of the current possible pixel m run (equal to ms+1) |
| ns | pointer to the start x-coordinate of the next black run on line i+n2, which is the current run of possible pixel n's (equal to me) |
| ne | pointer to the end x-coordinate of the current possible pixel n run (equal to ns+1) |
| ptr | pointer to the first location of an output buffer that will hold the start and end x-coordinates of pixel sequences that match the template |

FIG. 7 depicts the relative values contained in the locations pointed to by these various pointers for the exemplary pixel runs shown. That is, beneath the illustrated runs of pixels from lines i+n2, i, and i−n2 are indications of where the various pointers are set during the first three iterations of the test of FIG. 3.

For example, during the initialization process in step 301, pointers ks, cs, and ms are set equal to the memory addresses of locations containing the start x-coordinate of the first black pixel run on line i−n2, the first white pixel run on line i, and first white pixel run on line i+n2, respectively. In the illustrated example these x-coordinates are identical. Pointer ce points to a location containing the end x-coordinate of the first white pixel run on line i. Various pointers also point to locations containing x-coordinates of pixel runs on line i−n2, including pointer ke to the end of the first black pixel run, pointer ls to the start of the first white pixel run, and pointer le to the end of the first white pixel run on that line. Pointers me, ns, and ne point to locations containing the x-coordinates of the last pixel in the first white-run, the first black pixel, and the last black pixel in the first blackrun on line i+n2, respectively. (Recall that the end x-coordinate of a given run is assumed to be equal to the start x-coordinate of the next run).

Next, during step 302, a START coordinate is identified as the maximum, or rightmost, start x-coordinate of the five pixel runs currently being examined. Thus, the START coordinate is set equal to the maximum of *ks+n2, *ls−n2, *cs, *ms+n2, and *ns−n2. The notation used here is similar to that of the well-known computer language "C", so that "*ks" indicates an indirect address, i.e., the contents of the memory location pointed to by pointer ks. The coordinates for pixels k and m must be offset by adding n2, since they lie n2 pixels to the left of pixel c in the template. Likewise, the coordinates for pixels l and n must be offset by subtracting n2, since they lie to the right of pixel c.

The remaining steps in the process are iteratively executed in a do-while loop, beginning at step 303. The do-while loop continues until all runs on the current lines i−n2, i, and i+n2 are considered, as indicated when START is set equal to that start x-coordinate of a run at the end of these lines.

The first step in the do-while loop, step 304, is to set an END coordinate equal to the minimum, or leftmost, end x-coordinate of each of the five pixel runs. Thus, the END coordinate is set to the minimum of *ke+n2, *le−n2, *ce, *me+n2 and *ne−n2. In the first iteration with the example data of FIG. 7, the END coordinate is set to ce, which is the minimum, or rightmost end x-coordinate of the five runs.

In step 305, the START coordinate is recalculated as in step 303. During Iteration 1 of the example, the START coordinate is set to ns−n2.

In step 306, it is determined if the START coordinate is less than or equal to the END coordinate. If this is so, then at least one pixel in the current run passes the preprocessing test. The start and end coordinates of this sequence of adjacent pixels which pass are then stored in the output buffer location pointed to by PTR, and PTR is appropriately incremented. In many instances, this sequence of pixels will not be a complete run. In Iteration 1 of FIG. 7, no sequence of pixels matching the criteria tested for overlap, so control passes directly to step 310.

After storing the sequence coordinates, or if no such sequence needs to be stored, control next passes to step 310, where a series of tests are executed to increment the pixel run pointers to select pixel runs for the next iteration. At least one of the conditions in steps 310, 314, 318, 322 and 326 will be true, since step 304 sets the END coordinate to one of the five quantities compared with the END coordinate in those steps. In steps 312, 316, 320, 324 and 328, the corresponding START and END pointers are incremented.

On Iteration 1 of the FIG. 7 example, the test in step 318 succeeds, because the END coordinate was set to coordinate ce. Thus, the center pixel pointers cs and ce will be incremented by 2 to point to the start and end x-coordinates of the next white run on line i.

On Iteration 2 of the example, the END coordinate will be set to *ke+n2, as shown. The START coordinate will not change. Accordingly, the sequence of pixels between *ns−n2 and *ke+n2 passes the preprocessing test, and its coordinates are stored in the output buffer. During this iteration, since the END coordinate is set to *ke+n2, the pointers ke and ks are incremented in step 312.

Finally, on Iteration 3, the START coordinate is set to point to a run of pixels on the next line, and the do-while loop completes.

While the example described is for a template of width N, where N is odd, adaptations may be made for even number width templates.

Figure 8A:
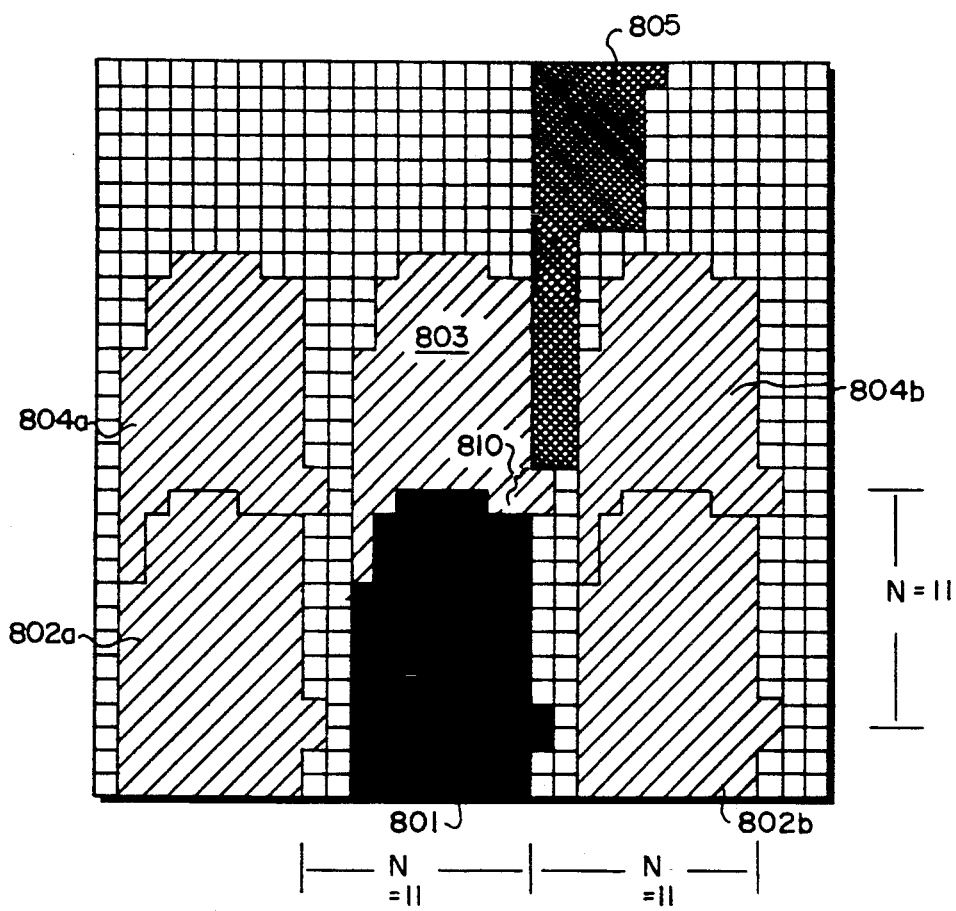
FIG. 8A shows a situation where two preprocessing templates are sequentially applied.

The techniques heretofore described are designed to detected gaps of length n−2 and smaller as previously indicated. However, in certain cases, smaller gaps may be missed. FIG. 8A is an example of one such instance. Feature 801 is shaped such that the gap between it and feature 805 will be missed if the template used is 11 pixels wide. Dotted elements 802, 803, and 804 are the feature area 801 displaced horizontally, vertically, and diagonally, respectively, to represent how the preprocessing stage operates. In this instance, the conditions of the truth table in FIG. 5C pass only if there is a black pixel somewhere in the dotted areas. Thus, since a feature 805 fits exactly between the various tested offsets of feature 801, the gap 810 will not be detected by the use of the 11 pixel template even though the gap 810 is only two pixels wide.

A way to solve this problem is to reduce the value of N. However, reducing N changes the size of detected gaps artificially away from the ideal N for the given application. As previously mentioned, the best value of N should be chosen on the basis of the width of the typical lines in the image being scanned. To avoid this dilemma, the process can be run twice, such as a first time with the ideal N set to that detects gaps based upon the line size, and a second with a smaller N to detect actual gaps missed in the first pass.

Figure 8B:
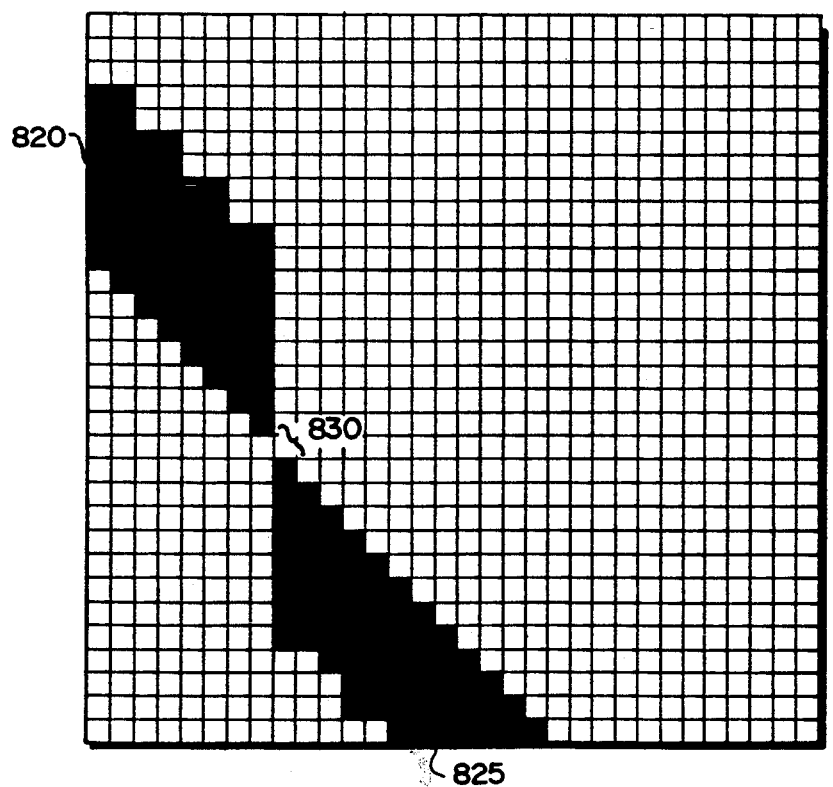
FIG. 8B shows a situation where the preprocessing stages appear to fail, but in which there is not truly a line gap.

FIG. 8B depicts a situation where there is clearly a gap, but for which it is impossible to construct a template which satisfies one of the conditions in the table of FIG. 5C. Although features 820 and 825 might be thought of as resulting from a broken human-drawn line, they in fact represent a line which has a large, exactly vertical offset at the gap 830. This is quite unlikely to occur in reality, and thus is not, practically speaking, a limitation of the invention.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. A method for detecting erroneous gaps in image data output by a scanner, the image data being a representation of pixels of a source image input to the scanner, the method comprising the steps of:
   storing the image data in a memory;
   reading the image data from the memory to determine the values of preselected pixels corresponding to a portion of the source image;
   comparing the values of the preselected pixels to a predetermined value pattern, by performing the steps of:
   comparing the value of a center pixel in the source image portion to a background pixel value;
   comparing the values of a first pair of peripheral pixels to a foreground pixel value, the first pair of peripheral pixels being located on the periphery of the source image portion; and comparing the values of a second pair of peripheral pixel values to a background pixel value, the second pair of peripheral pixels being located on the periphery of the image portion;

if the values of the preselected pixels match the predetermined value pattern, (i) producing an indication that a potential erroneous gas exists in the image data;

(ii) reading the image data to determined the values of other adjacent pixels in the source image portion adjacent the potential gap;

(iii) comparing the values of the other adjacent pixels to other predetermined value patterns; and (iv) if the other predetermined value patterns match the other adjacent pixel values, producing an indication that an erroneous gap exists in the image data.

2. A method as in claim 1 wherein the first pair of peripheral pixels is selected such that the center pixel is located along an axis between the first and second ones of the first pair of pixels.

3. A method as in claim 1 wherein the second pair of peripheral pixels is selected such that the center pixel is located along an axis between the first and second ones of the second pair of pixels.

4. A method as in claim 1 wherein the step of comparing the values of other adjacent pixels to other predetermined value patterns additionally comprises the step of:

comparing the values of the other adjacent pixels to the other predetermined value patterns to identify the location of two apparent line features located on opposite sides of the potential gap.

5. A method as in claim 1 wherein the step of comparing the values of the other adjacent pixels to other predetermined value patterns additionally comprises the steps of:

determining if the apparent line features have the topological characteristics of an erroneously scanned single line in the source image, by locating a perimeter pixel situated along the perimeter for each apparent line feature; and calculating the distance between the perimeter pixels for each apparent line feature.

6. A method as in claim 1 wherein the image data is bitmap-encoded, and the step of reading image data from the memory to determine the values of preselected pixels additionally comprises:

determining the pixel values by reading the contents of array locations in the memory.

7. A method as in claim 1 wherein the image data is run-encoded, and the step of reading image data from the memory to determine the values of preselected pixels additionally comprises:

determining the pixel values by reading the contents of locations in the memory corresponding to the start coordinates of runs of pixels in the source image.

8. A method for operating on image data output by a scanner in response to a source image, the image data being in the form of a bitmap representation containing a two-dimensional array of pixel values, the coordinates of the array location at which a particular pixel value is located being determined by the spatial position of a corresponding pixel of the source image, each pixel value representing the intensity of the corresponding pixel in the source image, the method being one for identifying the location of erroneously scanned pixel values corresponding to a line in the source image, the erroneous pixel values resulting in unintentional gaps in the image representation of the line, the method also distinguishing the gaps originating from such erroneous pixel value detection from other gaps formed intentionally as part of the source image, the method comprising the steps of:

storing the image data in a memory;

reading a center pixel value from the memory;

comparing the value of the center pixel to a background gap value;

if the center pixel value is equal to the background value, producing an indication that an erroneous gap does not exist adjacent the center pixel;

otherwise, if the center pixel value is not equal to the background value, (i) reading a first pair of pixel values from the memory, the first pixel of the first pair located a predetermined number of pixels away from the center pixel, and the second pixel of the first pair located a predetermined number of pixels away from the center pixel in an opposite direction;

(ii) reading a second pair of pixel values from the memory, the first pixel of the second pair located a predetermined number of pixels away from the center pixel, and the second pixel of the second pair located a predetermined number of pixels away from the center pixel in an opposite direction;

(iii) comparing the values of the first and second pair of pixel values to the background value and a foreground line value; and (iv) if each of the first pair of pixel values is equal to the foreground value, and each of the second pair of pixel values is equal to the background value, producing an indication that a potential erroneous gap exists adjacent the center pixel.

9. A method as in claim 8 additionally comprising the steps of, after the step (iv) of producing an indication that a potential erroneous gap exists adjacent the center pixel:

reading the image data to determine the location of a first feature edge pixel, the first feature edge pixel being a pixel having a value equal to the foreground line value, and located near the center pixel and the first pixel of the first pixel pair;

reading the image data to determine the location of a second feature edge pixel, the second feature edge pixel being that pixel having a value equal to the foreground line value, and located near the center pixel and the second pixel of the first pixel pair;

reading the image data to determine the location of a first feature terminus pixel, the first feature terminus pixel being a pixel having a value equal to the foreground line value, and located in a counter-clockwise direction and a predetermined number of pixels away from the first feature edge pixel, and located adjacent at least one pixel having a value equal to the background gap value;

reading the image data to determine the location of a second feature terminus pixel, the second feature terminus pixel being a pixel having a value equal to the foreground line value, and located in a clockwise direction and a predetermined number of pixels away from the second feature edge pixel, and located adjacent at least one pixel having a value equal to the background gap value;

calculating a first distance between the first feature terminus pixel and the second feature terminus pixel; and if the first distance is less than a predetermined distance, producing an indication that an erroneous gap does not exist adjacent the center pixel.

10. A method as in claim 9 additionally comprising the steps of:

reading the image data to determine the location of a third feature terminus pixel, the third feature terminus pixel being a pixel having a value equal to the foreground line value, and located in a clockwise direction and a predetermined number of pixels away from the first feature edge pixel, and located adjacent at least one pixel having a value equal to the background gap value;

reading the image data to determine the location of a fourth feature terminus pixel, the fourth feature terminus pixel being that pixel having a value equal to the foreground line value, and located in a counterclockwise direction and a predetermined number of pixels away from the second feature edge pixel, and located adjacent at least one pixel having a value equal to the background gap value;

calculating a second distance between the third feature terminus pixel and the fourth feature terminus pixel; and if the second distance is less than a predetermined distance, producing an indication that an erroneous gap does not exist adjacent the center pixel.

11. A method as in claim 10 additionally comprising the step of:

if the distance between the first terminus pixel and the third terminus pixel is greater than a predetermined amount, producing an indication that an unintentional gap does not exist adjacent the center pixel;

if the distance between the second terminus pixel and the fourth terminus pixel is greater than a predetermined amount, producing an indication that an erroneous gap does not exist adjacent the center pixel; and otherwise, producing an indication that erroneous gap does exist adjacent the center pixel.

12. A method for operating on image data output by a scanner in response to a source image, the image data encoded as a representation of the starting x-coordinates of runs of adjacent pixels from the same scan line having the same value the method identifying the location of erroneously detected pixel values corresponding to a line in the source image, the erroneous pixel values resulting in erroneous gaps in the image data, the method also distinguishing the gaps originating from such erroneous pixel value detection from other gaps formed intentionally as part of the source image, the method comprising the steps of:

storing the image data in a memory;

reading the image data to select a center pixel run from the representation, the center pixel run having a pixel value equal to a background gap value;

reading the image data to select a first pair of pixel runs from the representation, the first run of the first pair located a predetermined number of scan lines away from the center run, and the second run of the pair located a predetermined number of scan lines away from the center pixel in an opposite direction, both of the first pair of runs having pixel values equal to a predetermined foreground line value;

reading the image data to select a second pair of pixel runs from the representation, the first run of the second pair located a predetermined number of scan lines away from the center run, and the second run of the pair located a predetermined number of scan lines away from the center pixel in an opposite direction, both of the second pair of runs having pixel values equal to a predetermined background gap value;

calculating a maximum possible start coordinate by determining the maximum of the start coordinates of the center run, the first run of the first pair plus a predetermined offset, the second run of the first pair plus the offset, the first run of the second pair minus the offset, and the second run of the second pair minus the offset;

calculating a minimum possible end coordinate by determining the minimum of the end coordinates of the center run, the first run of the first pair plus an offset, the second run of the first pair plus the offset, the first run of the second pair minus the offset, and the second run of the second pair minus the offset, the end coordinates of runs calculated by determining the start coordinate of a next and;

if the minimum possible end coordinate is greater than the maximum possible start coordinate, producing an indication that an erroneous gap may exist adjacent at least one pixel of the center run.

13. A method as in claim 12 additionally comprising the step of:

iteratively reading the image data to select center pixel runs and first and second run pairs, and calculating maximum possible start and minimum possible end coordinates; and producing a list of pixel runs for which erroneous gaps exist.

14. A detector for detecting erroneous gaps in image data output by a scanner, the image data being a representation of pixels of a source image input to the scanner, the detector comprising:

means for storing the image data;

means for comparing the values of preselected pixels corresponding to a portion of the source image to a predetermined value pattern, comprising:

means for comparing the value of a center pixel in the image portion to a background gap value;

means for comparing the values of a first pair of peripheral pixels to a foreground pixel value, the first pair of peripheral pixels being located on the periphery of the source image portion; and means for comparing the values of a second pair of peripheral pixels to a background pixel value, the second pair of peripheral pixels located on the periphery of the image portion;

means for indicating, if the preselected pixel values match the predetermined value pattern, that a potential gap exists in the image data;

means for comparing the values of other adjacent pixels in the source image portion to other predetermined patterns; and means for indicating, if the other predetermined value patterns match the other adjacent pixels, that the image data contains an erroneous gap.

15. A detector as in claim 14 wherein the first pair of peripheral pixels is selected such that the center pixel is located along an axis between the first and second ones of the first pair of pixels.

16. A detector as in claim 14 wherein the second pair of peripheral pixels is selected such that the center pixel is located along an axis between the first and second ones of the second pair of pixels.

17. A detector as in claim 14 wherein the means for comparing the values of the other adjacent pixels to other predetermined value patterns additionally comprises:
   means for comparing the values of the other adjacent pixels to other predetermined value patterns to identify the location of two apparent line features located on opposite sides of the potential gap.

18. A detector as in claim 17 wherein the means for comparing the values of the other adjacent pixels to other predetermined value patterns additionally comprises:
   means for determining if the apparent line features have the topological characteristics of an erroneously scanned single line in the source image, and for locating a perimeter pixel situated along the perimeter for each apparent line feature; and
   means for calculating the distance between the perimeter pixels for each apparent line feature.

19. A detector as in claim 14 wherein the image data is bitmap-encoded, and means for comparing the values of preselected pixels to the predetermined pattern additionally comprises:
   means for reading the contents of locations in the memory.

20. A detector as in claim 14 wherein the image data is run-encoded, and the means for comparing the values of preselected pixels to the predetermined pattern additionally comprises:
   means for reading the contents of locations in the memory corresponding to the start coordinates of runs of pixels in the source image.

21. A detector for operating on image data output by a scanner in response to a source image, the image data being in the form of a bitmap representation containing a two-dimensional array of pixel values, the coordinates of the array at which a particular pixel value is located being determined by the spatial position of a corresponding pixel of the source image, each pixel value representing the intensity of the corresponding pixel in the source image, the detector identifying the location of erroneously detected pixel values corresponding to a line in the source image, the erroneous pixel values resulting in unintentional gaps in the image data representation of the line, the detector also distinguishing the gaps originating from such erroneous pixel value detection from other gaps formed intentionally as part of the source image, the detector comprising:
   means for storing the image data in a memory;
   means for reading a center pixel value from the memory;
   means for comparing the center pixel value to a background gap value;
   means for indicating, if the center pixel value is equal to the background value, that an erroneous gap does not exist adjacent the center pixel;
   means for reading a first pair of pixel values from the memory, the first pixel of the first pair located a predetermined number of pixels away from the center pixel, and the second pixel of the first pair located a predetermined number of pixels away from the center pixel in an opposite direction;
   means for reading a second pair of pixel values from the memory, the first pixel of the second pair located a predetermined number of pixels away from the center pixel, and the second pixel of the second pair located a predetermined number of pixels away from the center pixel in an opposite direction;
   means for comparing the values of the first and second pair of pixel values to the background value and a foreground line value; and
   means for indicating, if each one of the first pair of pixel values is equal to a foreground line value, and if each one of the second pair of pixel values is equal to a background gap value, that a potential erroneous gap exists adjacent the center pixel.

22. A detector as in claim 21 additionally comprising:
   means for reading the image data to determine the location of a first feature edge pixel, the first feature edge pixel being a pixel having a value equal to the foreground line value, and located near the center pixel and the first pixel of the first pixel pair;
   means for reading the image data to determine the location of a second feature edge pixel, the second feature edge pixel being that pixel having a value equal to the foreground line value, and located near the center pixel and the second pixel of the first pixel pair;
   means for reading the image data to determine the location of a first feature terminus pixel, the first feature terminus pixel being a pixel having a value equal to the foreground line value, and located in a counterclockwise direction and a predetermined number of pixels away from the first feature edge pixel, and located adjacent at least one pixel having a value equal to the background gap value;
   means for reading the image data to determine the location of a second feature terminus pixel, the second feature terminus pixel being a pixel having a value equal to the foreground line value, and located in a clockwise direction and a predetermined number of pixels away from the second feature edge pixel, and located adjacent at least one pixel having a value equal to the background gap value;
   means for calculating a first distance between the first feature terminus pixel and the second feature terminus pixel; and
   means for indicating, if the sum of the first and second distances is less than a predetermined distance, that an erroneous gap does not exist adjacent the center pixel.

23. A detector as in claim 22 additionally comprising:
   means for reading the image data to determine the location of a third feature terminus pixel, the third feature terminus pixel being a pixel having a value equal to the foreground line value, and located in a clockwise direction and a predetermined number of pixels away from the first feature edge pixel, and located adjacent at least one pixel having a value equal to the background gap value;
   means for reading the image data to determine the location of a fourth feature terminus pixel, the fourth feature terminus pixel being that pixel having a value equal to the foreground line value, and located in a counterclockwise direction and a predetermined number of pixels away from the second feature edge pixel, and located adjacent at least on pixel having a value equal to the background gap value;
   means for calculating a second distance between the third feature terminus pixel and the fourth feature terminus pixel; and means for indicating, if the second distance is less than a predetermined distance, that an erroneous gap does not exist adjacent the center pixel.

24. A detector as in claim 23 additionally comprising:

means for indicating, if the distance between the first terminus pixel and the third terminus pixel is greater than a predetermined amount, that an unintentional gap does not exist adjacent the center pixel;

means for indicating, if the distance between the second terminus pixel and the fourth terminus pixel is greater than a predetermined amount, that an erroneous gap does not exist adjacent the center pixel; and means for otherwise producing an indication that erroneous gap does exist adjacent the center pixel.

25. A detector for operating on image data output by a scanner in response to a source image, the image data encoded as a representation of the starting x-coordinates of runs of adjacent pixels from the same scan line having the same value, the detector identifying the location of erroneously detected pixel values corresponding to a line in the source image, the erroneous pixel values resulting in erroneous gaps in the image data, the detector also distinguishing the gaps originating from such erroneous pixel value detection from other gaps formed intentionally as part of the source image, the detector comprising:

memory means, for storing the image data;

means for reading the image data to select a center pixel run from the representation, the center pixel run having a pixel value equal to a background gap value;

means for reading the image data to select a first pair of pixel runs from the representation, the first run of the first pair located a predetermined number of scan lines away from the center run, and the second run of the pair located a predetermined number of scan lines away from the center pixel in an opposite direction, both of the first pair of runs having pixel values equal to a predetermined foreground line value;

means for reading the image data to select a second pair of pixel runs from the representation, the first run of the second pair located a predetermined number of scan lines away from the center run, and the second run of the pair located a predetermined number of scan lines away from the center pixel in an opposite direction, both of the second pair of runs having pixel values equal to a predetermined background gap value;

means for calculating a maximum possible start coordinate by determining the maximum of the start coordinates of the center run, the first run of the first pair plus a predetermined offset, the second run of the first pair plus the offset, the first run of the second pair minus the offset, and the second run of the second pair minus the offset;

means for calculating a minimum possible end coordinate by determining the minimum of the end coordinates of the center run, the first run of the first pair plus an offset, the second run of the first pair plus the offset, the first run of the second pair minus the offset, and the second run of the second pair minus the offset, the end coordinates of runs calculated by determining the start coordinate of a next adjacent run; and means for indicating, if the minimum possible end coordinate is greater than the maximum possible start coordinate, that an erroneous gap exists adjacent at least one pixel of the center run.

26. A detector as in claim 25 additionally comprising:

means for iteratively reading the image data to select center pixel runs, and first and second run pairs, calculating maximum possible start and minimum possible end coordinates; and means for producing a list of pixel runs for which erroneous gaps exist.

* * * * *

UNITED STATES PATENT AND TRADEMARK OFFICE
CERTIFICATE OF CORRECTION

PATENT NO. : 5,153,748
DATED : October 6, 1992
INVENTOR(S) : Alan I. Moyer

It is certified that error appears in the above-indentified patent and that said Letters Patent is hereby corrected as shown below:

In Claim 1:

Col. 13, line 8, delete "gas" and insert --gap--;

Col. 13, line 9, delete "determined" and insert --determine--'

In Claim 12:

Col. 16, line 24, delete "and" and insert --adjacent run; and--

In Claim 23:

Col. 18, line 64, delete "on" and insert --one--.

Signed and Sealed this

Twenty-sixth Day of October, 1993

Attest:

BRUCE LEHMAN

Attesting Officer

Commissioner of Patents and Trademarks